(12) United States Patent
Harkness

(10) Patent No.: US 9,275,765 B2
(45) Date of Patent: Mar. 1, 2016

(54) METHOD AND APPARATUS FOR THE SHIELDED RELOCATION OF A NUCLEAR COMPONENT

(71) Applicant: WESTINGHOUSE ELECTRIC COMPANY LLC, Cranberry Township, PA (US)

(72) Inventor: Alexander W. Harkness, Gibsonia, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 430 days.

(21) Appl. No.: 13/741,664

(22) Filed: Jan. 15, 2013

(65) Prior Publication Data

US 2014/0198889 A1  Jul. 17, 2014

(51) Int. Cl.
*G21C 19/105* (2006.01)
*G21F 5/008* (2006.01)
*G21C 19/16* (2006.01)

(52) U.S. Cl.
CPC .............. *G21C 19/105* (2013.01); *G21F 5/008* (2013.01); *G21C 19/16* (2013.01)

(58) Field of Classification Search
CPC .............................. G21C 19/16; G21C 19/105
USPC .................................. 376/262, 268, 271, 272
See application file for complete search history.

(56) References Cited

U.S. PATENT DOCUMENTS

| 3,797,860 | A | * | 3/1974 | Peterson et al. | ............... | 376/272 |
| 4,032,240 | A | * | 6/1977 | Reinhardt et al. | ............ | 376/271 |
| 4,650,641 | A | | 3/1987 | Formanek | | |
| 4,717,531 | A | * | 1/1988 | Hardin, Jr. | ................... | 376/272 |
| 2004/0017876 | A1 | | 1/2004 | Stilwell, III et al. | | |
| 2012/0201340 | A1 | | 8/2012 | Pennington et al. | | |
| 2014/0023171 | A1 | * | 1/2014 | Arai et al. | ..................... | 376/268 |

FOREIGN PATENT DOCUMENTS

| CN | 102208221 A | 10/2011 |
| JP | 2003149379 A | 5/2003 |

OTHER PUBLICATIONS

International Search Report and Written Opinion of the International Searching Authority for PCT/US2013/075543 dated Oct. 13, 2014 (Forms PCT/ISA/220, PCT/ISA/210, PCT/ISA/237).

* cited by examiner

*Primary Examiner* — Tashiana Adams
*Assistant Examiner* — Daniel Wasil
(74) *Attorney, Agent, or Firm* — Joseph C. Spadacene; Westinghouse Electric Company LLC

(57) ABSTRACT

A nuclear component transfer device that incorporates a shielded canister into the mast design of a conventional nuclear refueling machine. A moveable mast telescopes within a stationary mast which is attached to a bridge for lateral positioning. The canister allows for the addition of shielding that is positioned with the movement of the moveable mast without additional motorized components to deploy the shielding during nuclear component movement. The nuclear component is drawn up into the shielded canister as the moveable mast lifts the nuclear component. The nuclear component is then placed into a transfer cart that is also fitted with a shielded canister. The transfer is made without exposing the nuclear components resulting in completely shield movement.

9 Claims, 6 Drawing Sheets

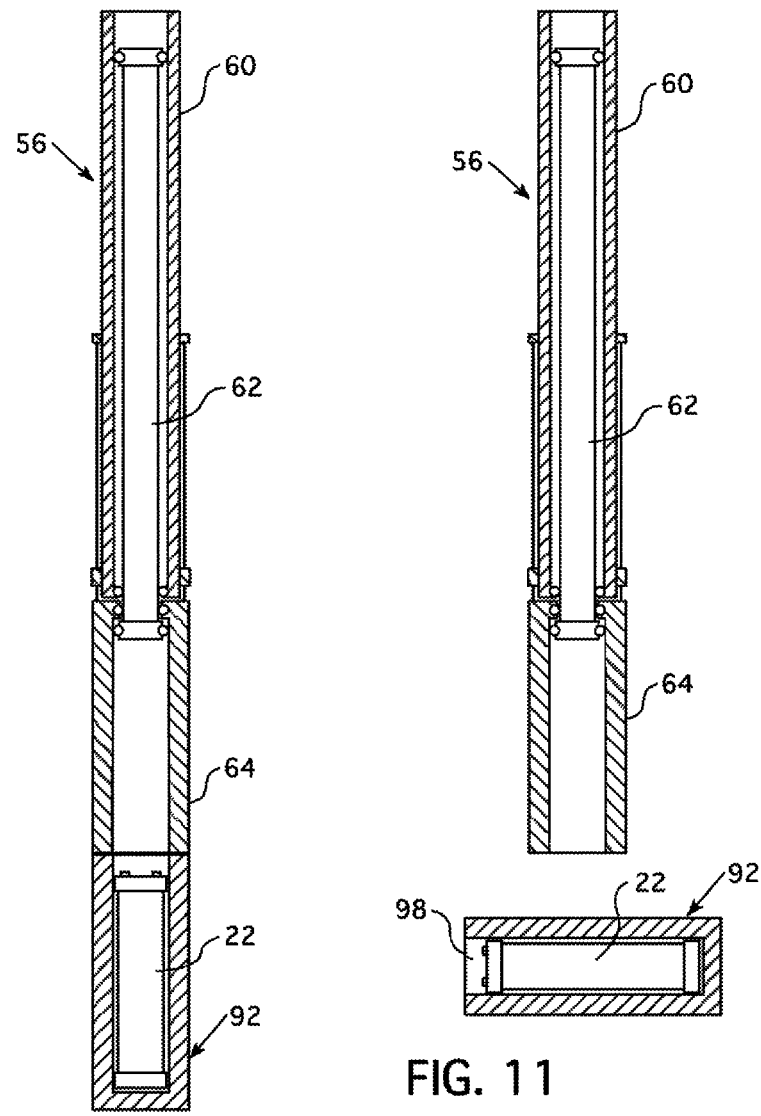

METHOD AND APPARATUS FOR THE SHIELDED RELOCATION OF A NUCLEAR COMPONENT

BACKGROUND

1. Field

This invention relates generally to nuclear reactor systems, and in particular, to a method and apparatus for refueling a nuclear reactor.

2. Description of Related Art

A pressurized water reactor has a large number of elongated fuel assemblies mounted within an upright reactor vessel. Pressurized coolant is circulated through the fuel assemblies to absorb heat generated by nuclear reactions in fissionable material contained in the fuel assemblies. The primary side of such a nuclear reactor power generating system which is cooled with water under pressure comprises an enclosed circuit which is isolated from and in heat exchange relationship with a secondary circuit for the production of useful energy. The primary side comprises the reactor vessel enclosing a core a pressurizer, pumps and pipes for circulating pressurized water; the pipes connecting each of the steam generators and pumps to the reactor vessel independently. In conventional nuclear plants of that type each of the parts of the primary side comprising the steam generator, a pump and a system of pipes which are connected to the reactor vessel form a loop of the primary side.

For the purpose of illustration, FIG. 1 shows a simplified conventional nuclear reactor primary system, including a generally cylindrical pressure vessel 10 having a closure head 12 enclosing a nuclear core 14. A liquid coolant, such as water or borated water, is pumped into the vessel 10 by pumps 16 through the core 14 where heat energy is absorbed and is discharged to a heat exchanger 18, typically referred to as a steam generator, in which heat is transferred to a utilization circuit (not shown), such as a steam driven turbine generator. The reactor coolant is then returned to the pump 16, completing the primary loop. Typically, a plurality of the above described loops are connected to a single reactor vessel 10 by reactor coolant piping 20.

An exemplary conventional reactor design is shown in more detail in FIG. 2. In addition to the core 14 comprised of a plurality of parallel, vertically co-extending fuel assemblies 22, for the purpose of this description, the other vessel internal structures can be divided into the lower internals 24 and the upper internals 26. In conventional designs, the lower internals function to support, align and guide core components and instrumentation as well as direct flow within the vessel. The upper internals restrain or provide a secondary restraint for the fuel assemblies 22 (only two of which are shown for simplicity in FIG. 2), and support and guide instrumentation and components, such as control rods 28. In the exemplary reactor shown in FIG. 2, coolant enters the reactor vessel through one or more inlet nozzles 30, flows down through an annulus between the reactor vessel and the core barrel 32, is turned 180° in a lower plenum 34, passes upwardly to a lower support plate 37 and a lower core plate 36 upon which the fuel assemblies are seated and through and about the fuel assemblies 22. In some designs, the lower support plate 37 and the lower core plate 36 are replaced by a single structure, a lower core support plate having the same elevation as 37. The coolant flow through the core and surrounding area 38 is typically large on the order of 400,000 gallons per minute at a velocity of approximately 20 feet per second. The resulting pressure drop and frictional forces tend to cause the fuel assemblies to rise, which movement is restrained by the upper internals, including a circular upper core plate 40. Coolant exiting the core 14 flows along the underside of the upper core plate and upwardly through a plurality of perforations 42. The coolant then flows upwardly and radially to one or more outlet nozzles 44.

The upper internals 26 can be supported from the vessel or the vessel head and include an upper support assembly 46. Loads are transmitted between the upper support assembly 46 and the upper core plate 40 primarily by a plurality of support columns 48. Each support column is aligned above a selected fuel assembly 22 and perforations 42 in the upper core plate 40.

Rectilinearly moveable control rods 28 which typically include a drive shaft or drive rod 50 and a spider assembly 52 of neutron poison rods, are guided through the upper internals 26 and into aligned fuel assemblies 22 by control rod guide tubes 54. The guide tubes are fixedly joined to the upper support assembly 46 and the top of the upper core plate 40. The support column 48 arrangement assists in retarding guide tube deformation under accident conditions which could detrimentally affect control rod insertion capability.

To control the fission process, a number of control rods 28 are reciprocally moveable in guide thimbles located at predetermined positions in the fuel assemblies 22. Specifically, a control rod mechanism positioned above the top nozzle of the fuel assemblies supports a plurality of control rods. The control rod mechanism (also known as a rod cluster control assembly) has an internally threaded cylindrical hub member with a plurality of radial extending flukes or arms that form the spider 52 previously noted with regard to FIG. 2. Each arm is interconnected to a control rod 28 such that the control rod assembly mechanism 72 is operable to move the control rods 28 vertically within the guide thimbles within the fuel assemblies to thereby control the fission process in the fuel assembly 22, under the motive power of the control rod drive shaft 50 which is coupled to the control rod mechanism hub, all in a well known manner.

The upper internals 26 also have a number of in-core instrumentation that extend through axial passages within the support columns 48 and into instrumentation thimbles generally, centrally located within the fuel assemblies. The in-core instrumentation typically includes a thermocouple for measuring the coolant core exit temperature and axially disposed neutron detectors for monitoring the axial and radial profile of neutron activity within the core.

Nuclear power plants, which employ light water reactors require periodic outages for refueling of the reactor. New fuel assemblies are delivered to the plant and temporarily stored in a fuel storage building, along with used fuel assemblies which may have been previously removed from the reactor. During a refueling outage, a portion of the fuel assemblies in the reactor are moved from the reactor to the fuel storage building. A second portion of the fuel assemblies are moved from one support location in the reactor to another core support location in the reactor. New fuel assemblies are moved from the fuel storage building into the reactor to replace those fuel assemblies which were removed. These movements are done in accordance with a detailed sequence plan so that each fuel assembly is placed in a specific location in accordance with an overall refueling plan prepared by the reactor core designer. In conventional reactors, the removal of the reactor internal components necessary to access the fuel and the movement of the new and old fuel between the reactor and the spent fuel pool in the fuel storage building is performed under water to shield the plant maintenance personnel. This is accomplished by raising the water level in the refueling cavity and canal that is integral to the plant's building structure. The water level of more than 20 feet provides shielding for the movement of the reactor internal structures and the fuel assemblies.

Refueling activities are often on a critical path for returning the nuclear plant to power operation, therefore, the speed of these operations is an important economic consideration for the power plant owner. Furthermore, the plant equipment and fuel assemblies are expensive and care must be taken not to cause damage or unnecessary radiation exposure due to improper handling of the reactor components that have to be removed to access the fuel assemblies, the fuel assemblies or fuel transfer equipment. The precision of these operations is also important since the safe and economical operation of the reactor core depends upon each fuel assembly being in its proper location. A typical pressurized water reactor needs to be refueled every 18 to 24 months.

Commercial power plants employing the conventional designs generally illustrated in FIGS. 1 and 2 are typically on the order of 1,100 megawatts or more. More recently, Westinghouse Electric Company LLC has proposed a small modular reactor in the 200 megawatt class. The small modular reactor is an integral pressurized water reactor with all primary loop components located inside the reactor vessel. The reactor vessel is surrounded by a compact, high pressure containment. Due to both limited space within the containment and the low cost requirement for integral pressurized light water reactors, the overall number of auxiliary systems including those associated with refueling needs to be minimized without compromising safety or functionality. For example, the compact high pressure containment associated with the design of some small modular reactors does not allow for the incorporation of a large floodable cavity above the reactor vessel in which the transferred components can be shielded. Even in conventional designs, it would be desirable to reduce the amount of flooding required for refueling to save time and the expense of the operation.

Accordingly, it is an object of this invention to provide a method and apparatus for shielding the movement of a fuel assembly that does not require flooding of the containment.

It is a further object of this invention to provide such a method and apparatus that does not require the addition of motorized components to deploy shielding during fuel movement.

It is an additional object of this invention to provide such a method and apparatus which practically does not require additional storage space over that currently required.

SUMMARY

These and other objects are achieved by a machine for moving a nuclear plant component from a first location to another that has a bridge assembly for positioning the machine over the nuclear plant component to be moved. A stationary mast is supported from the bridge assembly at a first end and extends down from the bridge assembly in the direction of the nuclear plant component. A moveable mast is telescopically nested within the stationary mast and configured to extend from the stationary mast and retract within the stationary mast under the control of an operator. A mast shield canister has an axially extending central opening through which the moveable mast can extend. The mast shield canister has an upper end portion and a lower end portion with a first stop on the upper end portion of the mast shield canister and/or on a lower end of the moveable mast preventing the lower end of the moveable mast from withdrawing out of the upper end portion of the mast shield canister. A second stop is provided on either or both the stationary mast or the mast shield canister that prevents the mast shield canister from moving more than a preselected distance from the stationary mast; the mast shield canister being sized at least to fit over substantially the full length of the nuclear plant component. A gripper assembly is supported at a lower end of the moveable mast and is configured to grip the nuclear plant component through the lower end portion of the mast shield canister. Preferably, the preselected distance is substantially long enough to place the mast shield canister on top of the nuclear plant component.

In one embodiment the first stop comprises a first set of rollers circumferentially supported around an inner wall of the central opening on the upper end portion of the mast shield canister, that is at least in part in axial and circumferential alignment with a second set of rollers on the lower end of the moveable mast, below the first set of rollers. Preferably the second stop is a rod or cable attached to the upper end portion of the mast shield canister at a first end of the rod or cable and slidably coupled to the stationary mast at a second end portion of the rod or cable through an opening in an eyelet or tube that is affixed to the stationary mast with a second end of the second end portion of the rod or cable being larger than the opening in the eyelet or tube. Desirably, the mast shield canister is configured so that a downward movement of the mast shield canister relative to the moveable mast is powered solely under the force of gravity and an upward movement of the mast shield canister relative to the stationary mast is solely under the power of the moveable mast.

The machine may also include a transfer cart having a moveable platform for moving the nuclear plant component from a first location to a second location. The transfer cart has a transfer cart shield canister having a central opening substantially completely enclosed by a shield wall system except for an open end providing access to the central opening with the central opening being sized to substantially enclose the nuclear plant component. The transfer cart also includes a rotatable coupling between the moveable platform and the transfer cart shield canister for rotating the transfer can shield canister from a generally horizontal position, where the nuclear plant component within the transfer cart shield canister is on its side, to a generally vertical position, where the open end is facing substantially in an upward direction to face the gripper assembly, and back to the horizontal position.

In another embodiment, the central opening in the transfer cart shield canister substantially matches the central opening through the mast shield canister and the gripper assembly is configured to extend through the lower end portion of the mast shield canister into the central opening of the transfer cart shield canister to place the nuclear plant component within the transfer cart shield canister.

The invention also contemplates a method for relocating the nuclear plant component with the machine described above including the step of moving the bridge assembly to position the machine over the nuclear plant component to be relocated with the gripper assembly aligned with the nuclear plant component. Then the moveable mast is moved downward with the mast shield canister suspended below the gripper. The method then supports the lower end portion of the mast shield canister above the nuclear plant component with the nuclear plant component in line with the central opening through which the moveable mast can extend. The moveable mast is then lowered through the central opening and the gripper assembly engages on a top surface of the nuclear plant component. The method then raises the moveable mast to withdraw the moveable mast and the nuclear plant component upward within the central opening and moves the bridge assembly to position the nuclear plant component at a new location. The method may also include the steps of lowering the moveable mast at the new location; disengaging the gripper assembly from the nuclear plant component; and raising the moveable mast.

In still another embodiment the new location is a transfer cart comprising a moveable platform for transporting the nuclear plant component; wherein the moveable platform has a transfer cart shield canister with a central opening substantially completely enclosed by a shield wall system except for an open end providing access to the central opening, with the central opening being sized to substantially enclose the nuclear plant component; and a rotatable coupling between the moveable platform and the transfer cart shield canister for rotating the transfer cart shield canister from a generally horizontal position where the nuclear plant component within the transfer cart shield canister is on a side, to a vertical position, where the open end is facing substantially in an upward direction to face the gripper assembly, and back to a horizontal position. In this embodiment, the method includes the step of rotating the rotatable couplings so that the transfer cart shield canister is in the vertical position. Then the method lowers the moveable mast so a lower end of the mast shield canister substantially rests on a top surface of the shield wall system. Then the method lowers the moveable mast through the central opening in the mast shield canister to lower the nuclear plant component within the opening in the shield wall system. The gripper assembly is then disengaged from the nuclear plant component and the moveable mast is raised. Preferably, the transfer cart shield canister is then rotated to a horizontal position and transported to a new destination. Desirably, in this embodiment, the step of raising the moveable mast after disengaging the gripper assembly includes the step of raising the mast shield canister so that an upper end of the mast shield canister substantially rests against the lower end of the stationary mast.

The foregoing apparatus and method is particularly suited for moving nuclear fuel assemblies between a reactor and a spent fuel pool.

BRIEF DESCRIPTION OF THE DRAWINGS

A further understanding of the invention can be gained from the following description of the preferred embodiments when read in conjunction with the accompanying drawings in which:

FIG. 10 is a sectional view of the fuel transfer machine shown in FIG. 9 with the gripper released and moveable mast raised; and FIG. 11 is a sectional view of the refueling machine and transfer cart shown in FIG. 10 with the transfer cart shielded canister rotated to a horizontal position for transport through a transfer tube.

DESCRIPTION OF THE PREFERRED EMBODIMENT

This invention provides a practical means to incorporate gamma radiation shielding into the mast of a refueling machine. A shielded canister is incorporated into the mast design. The shielded canister is raised and lowered with a mast similar in design to those already in use in pressurized water reactor plants. The moveable mast telescopes within a stationary mast. The stationary mast is attached to a conventional bridge of the refueling machine. The invention allows for the addition of shielding that is positioned with the movement of the moveable mast. It does not require the addition of motorized components to deploy the shielding during fuel movement. The fuel is drawn up into the shielded canister as the moveable mast lifts the fuel assembly from the reactor core. The fuel assembly is then placed into a transfer cart which is also fitted with a shielded canister. The transfer is made without exposing the fuel assembly. The result is completely shielded fuel movement. The shielded material employed in the mast and the fuel transfer cart could be any high density material that is typically used to shield gamma radiation, e.g., concrete, etc.

Figure 1:
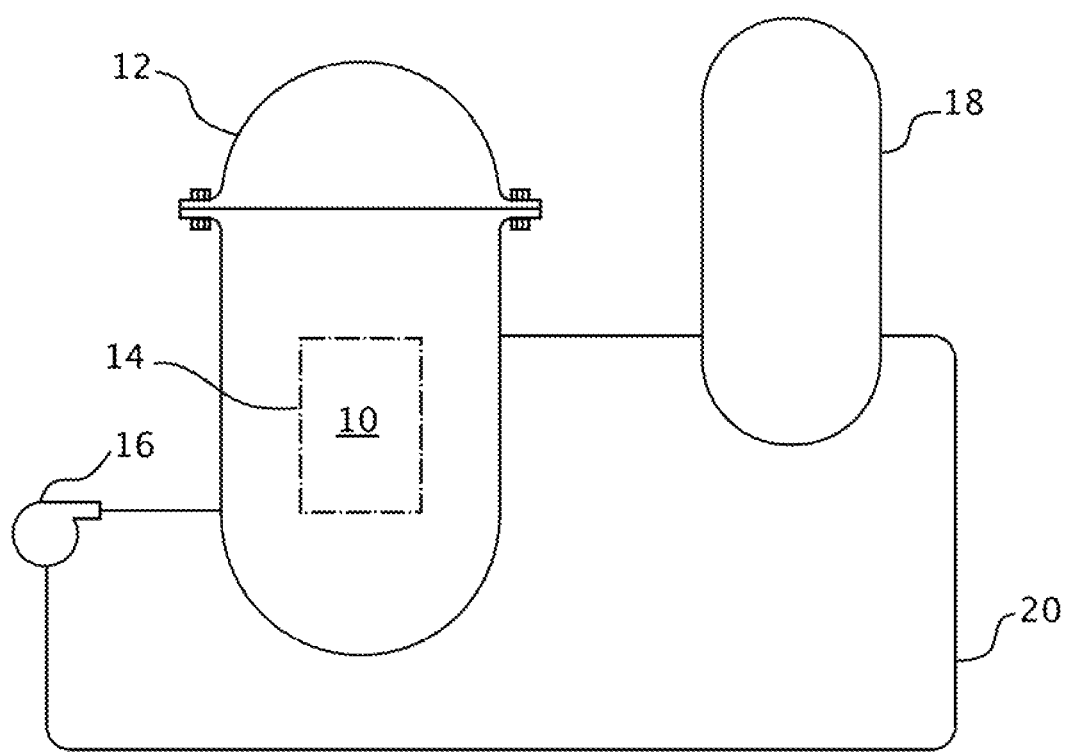
FIG. 1 is a simplified schematic of a conventional nuclear reactor system to which the embodiments described hereafter can be applied.
Figure 2:
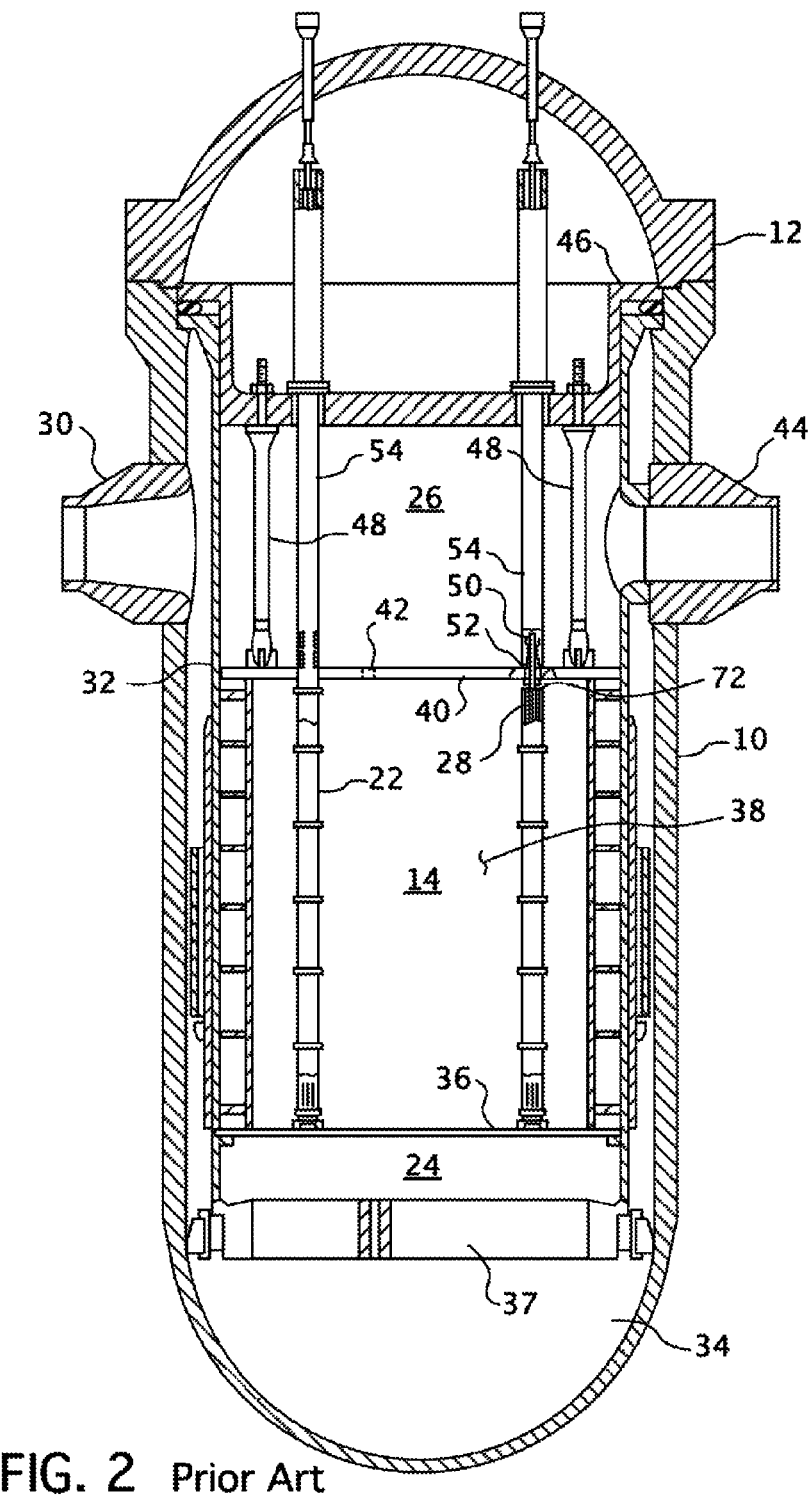
FIG. 2 is an elevational view, partially in section, of a nuclear reactor vessel and internal components to which the embodiments described hereafter can be applied.
Figure 3:
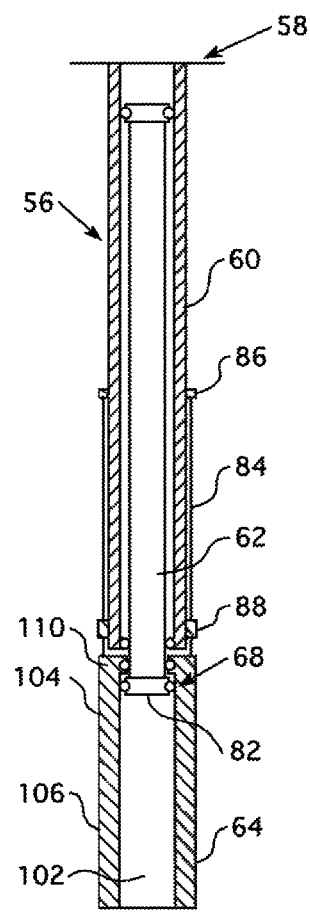
FIG. 3 is a sectional view of the refueling machine of one embodiment of this invention positioned above a fuel assembly.

FIG. 3 shows a schematic cross sectional view of one embodiment of the fuel transfer machine 56 with a bridge assembly 58 for positioning the machine over the fuel assembly 22 to be moved. A stationary mast 60 is supported from the bridge assembly 58 at a first end and extends down from the bridge assembly in the direction of the fuel assembly 22. A moveable mast 62 is telescopingly nested within the stationary mast 60 and configured to extend from the stationary mast and retract within the stationary mast under the control of an operator (not shown). To that extent, the refueling machine illustrated in FIG. 3 is substantially conventional with the bridge assembly riding on wheels that are guided on tracks on the operating deck of a nuclear plant. In accordance with this embodiment, the mast shield canister 64 has an axially extending central opening 102 through which the moveable mast can extend and is suspended from a lower end of the moveable mast 62 during the mast shield canister's travel downward. The mast shield canister 64 has an upper end portion, with a first stop 68 on the upper end portion of the mast shield canister 64 and/or on a lower end of the moveable mast 62 preventing the lower end of the moveable mast from withdrawing out of the upper end portion 104 of the mast shield canister 64 and a second stop 70 on either or both the stationary mast 60 or the mast shield canister 64 that prevents the mast shield canister from moving more than a preselected distance from the stationary mast. The mast shield canister 64 is sized at least to fit over substantially the full length of the nuclear component. A gripper assembly 82 is supported at a lower end of the moveable mast 62 and is configured to grip the nuclear plant component (in this example a fuel assembly)

through the lower end portion 104 of the mast shield canister 64. The first stop 68 illustrated in the embodiments shown in FIGS. 3-11 comprises a first set of rollers 78 circumferentially supported around an inner wall of the central opening 102 on the upper end portion 104 of the mast shield canister 64, that is at least in part in axial and circumferential alignment with a second set of rollers 80 on the lower end of the moveable mast 62, below the first set of rollers 78. The roller guides ensure lateral alignment while allowing the moveable mast 62 to move up and down. The rollers can ride in axial grooves to assure rotational stability. The interference of the rollers 78 and 80 prevents the mast shield canister from leaving the end of the moveable mast 62. However, a mechanical release can be provided for the rollers 78 so they can withdraw into their socket and release the mast shield canister 64 from the moveable mast 62 so it can be exchanged for corresponding mast shield canisters having other interior dimensions that will accommodate other core components that need to be removed from the reactor vessel. Accordingly, though the nuclear component transfer device shown in FIGS. 3-11 is illustrated in a configuration to transfer fuel assemblies, it should be appreciated that this invention has applicability to transfer other nuclear components as well. Additionally, the mast shield canister 64 illustrated in the figures is also shown to have an upper flange 110 which can also serve as a mechanical stop against the gripper 82 at the end of the moveable mast 62 to prevent the mast from being withdrawn entirely from the central opening 102. Other mechanical stops can also be configured for this purpose. A similar stop arrangement is provided between the stationary mast 60 and the moveable mast 62 to prevent the moveable mast 62 from being completely withdrawn from the stationary mast 60. A second mechanical stop 70 is configured between the upper portion 104 of the mast shield canister 64 and the lower end of the stationary mast 60. The second mechanical stop is a rod or cable 84 that is threaded through an eyelet or sleeve 88 that is attached to the outside of the lower end of the stationary mast 60. The cable or rod 84 is attached to the upper end portion 104 of the mast shield canister 64 at a first end of the rod or cable and slidably coupled to the stationary mast 60 at the second end portion of the rod or cable 84 through an opening in the eyelet or tube 88 with an end portion 86 of the rod or cable being larger than the opening in the eyelet or tube 88 so that the mast shield canister 64 can be lowered a preselected distance which in this embodiment is substantially equal to the length of the cables 84.

Figure 4:
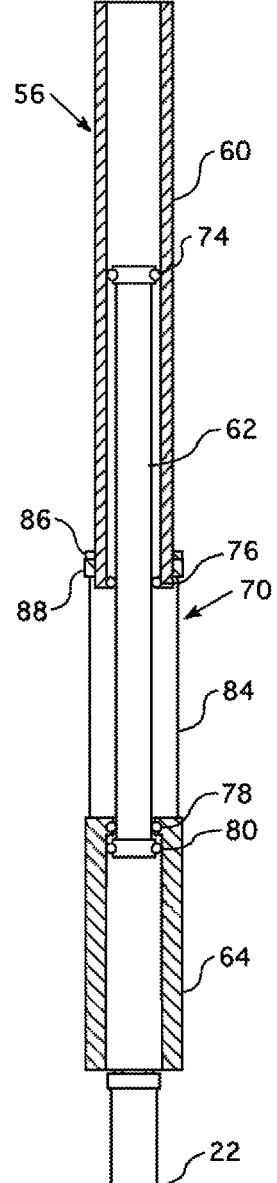
FIG. 4 is a sectional view of the refueling machine shown in FIG. 3 with the moveable mast lowered until shielding stops engage.
Figure 5:
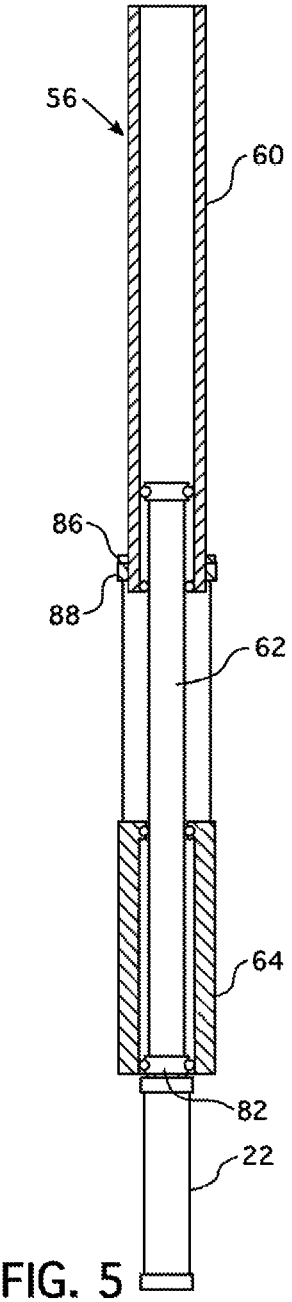
FIG. 5 is a sectional view of the refueling machine shown in FIGS. 3 and 4 with the moveable mast lowered to the fuel assembly and gripper engaged.
Figure 6:
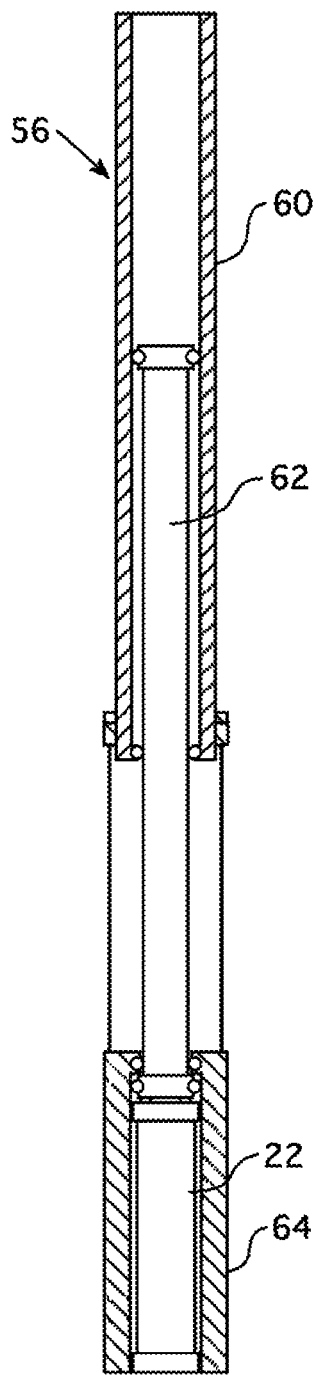
FIG. 6 is a sectional view of the refueling machine shown in FIGS. 3, 4 and 5 with the moveable mast and the fuel assembly raised until the fuel assembly is within the shield.
Figure 7:
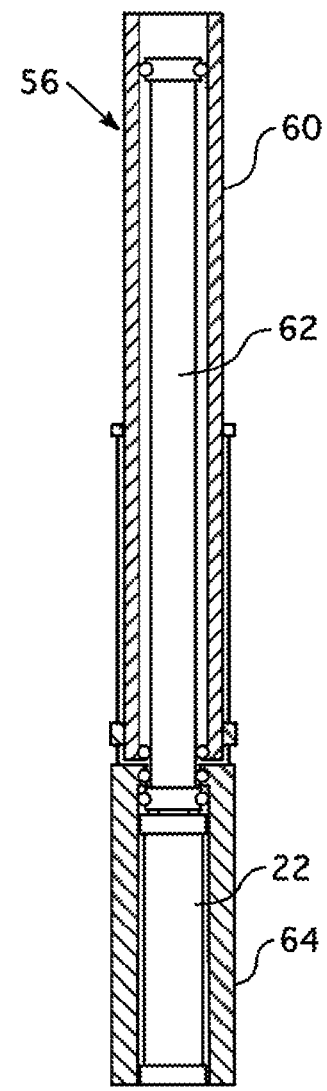
FIG. 7 is a sectional view of the refueling machine of FIGS. 3, 4, 5 and 6 with the moveable mast and fuel assembly raised until the shield engages with the stationary mast.

As can be seen in FIG. 4 as the moveable mast 62 is lowered, the mast shield canister 64 lowers under the force of gravity against the stop 68 until the limit of the stop 70 is reached. Desirably, the length of the cables 84 are long enough to place the central opening 102 at the lower end of the mast shield canister 64 right over the fuel assembly 22 as shown in FIG. 4. Then the moveable mast 62 continues traveling downward until the gripper assembly can engage the fuel assembly 22 as shown in FIG. 5. Desirably, the length of the central opening 102 below the completely withdrawn gripper assembly is at least substantially equal to the height of the fuel assembly 22 so the fuel assembly can be totally withdrawn within the mast shield canister 64 as the moveable mast 62 is raised after the fuel assembly has been engaged, as shown in FIG. 6. Then the lower end of the moveable mast 62 engages the first stop 68 and raises the mast shield canister 64 into engagement with the lower end of the stationary mast 60 as shown in FIG. 7. Thus, the fuel assembly 22 can be removed from the reactor core, or from the spent fuel pool, as the case may be, completely shielded within the mast shield canister 64 and the bridge assembly can then be moved to a fuel transfer cart that can move the fuel assembly between the reactor and the spent fuel pool.

Figure 8:
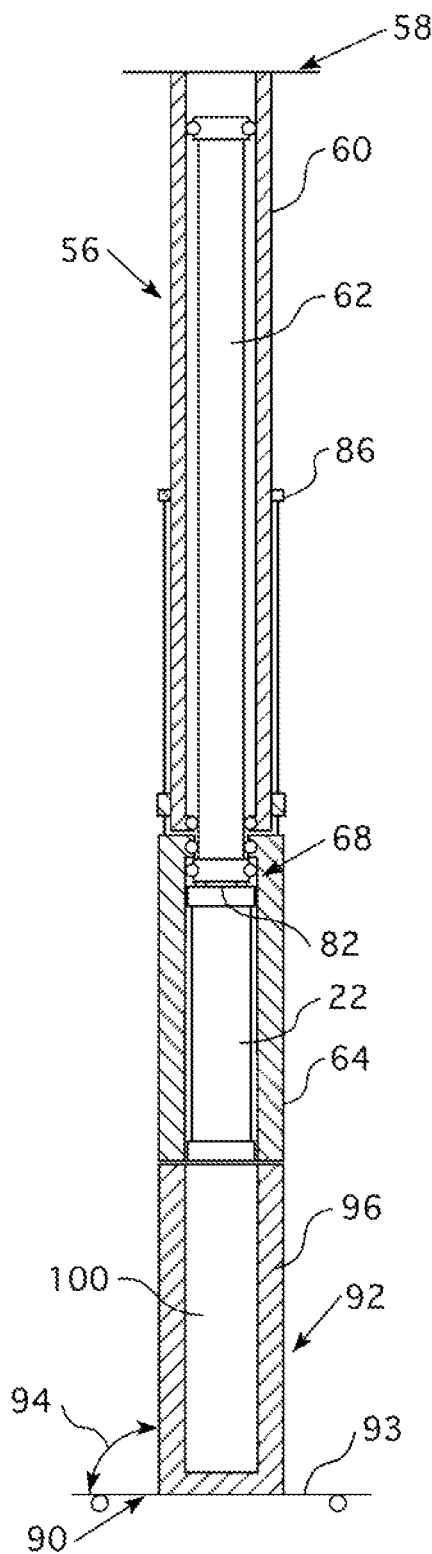
FIG. 8 is a sectional view of the refueling machine shown in FIGS. 3, 4, 5, 6 and 7 showing the moveable mast positioned above a shielded canister of a transfer cart.
Figure 9:
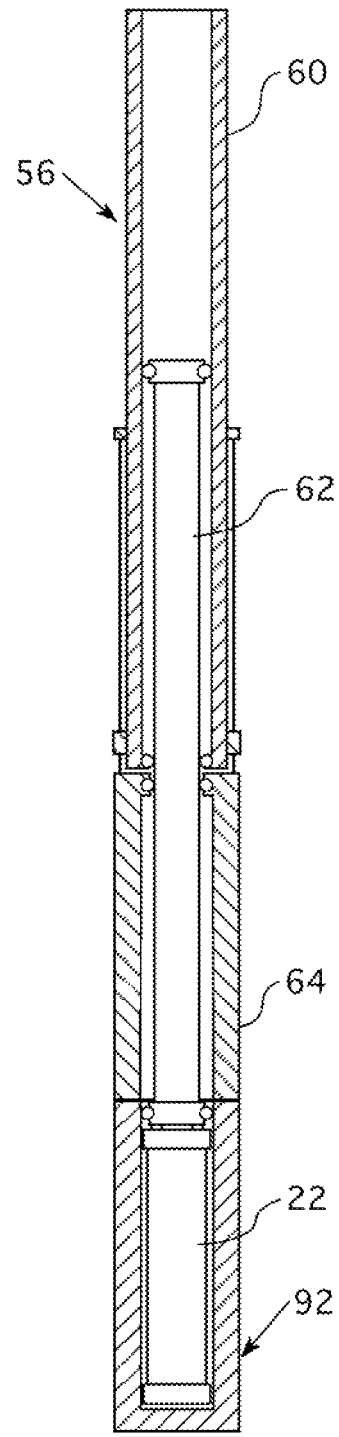
FIG. 9 is a sectional view of the refueling machine of FIGS. 3, 4, 5, 6, 7 and 8 showing the fuel assembly lowered into the shielded canister on the transfer cart.

FIGS. 8-11 illustrate the reverse operation where the fuel assembly is loaded into a transfer cart 90 for transport between the reactor and the spent fuel pool. The bridge assembly 58 positions the mast shield canister 64 over a transfer cart shield canister 92 having a central opening 100 substantially completely enclosed by a shield wall system 96, except for an open end 98 providing access to the central opening. The central opening is sized to substantially enclose the nuclear fuel assembly 22 and the transfer cart is connected to a moveable platform 93 through a rotatable coupling 94. The rotatable coupling rotates the transfer cart shield canister 92 from a generally horizontal position, where the nuclear fuel assembly within the transfer cart shield canister is on a side, to a generally vertical position, as shown in FIG. 8, where the open end 98 is facing substantially in an upward direction to face the gripper assembly 82. Desirably, the central opening 100 in the transfer cart shield canister 92 substantially matches the central opening 102 through the mast shield canister 64 and the gripper assembly 82 is configured to extend through the lower end portion of the mast shield canister into the central opening 100 of the transfer cart shield canister 92 to seat the nuclear fuel assembly 22 within the transfer cart shield canister as shown in FIG. 9. The moveable mast 62 is then raised as shown in FIG. 10, preferably to rest the top of the mast shield canister 64 against the bottom of the stationary mast 60. The transfer cart shield canister 92 is then rotated to a horizontal position for transport as shown in FIG. 11.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A machine for moving a nuclear plant component from a first location to another comprising:
   a bridge assembly for positioning the machine over the nuclear plant component to be moved;
   a stationary mast supported from the bridge assembly at a first end and extending down from the bridge assembly in a direction of the nuclear plant component;
   a moveable mast, telescopingly nested within the stationary mast and configured to extend from the stationary mast and retract within the stationary mast under the control of an operator;
   a mast shield canister, having an outer wall configured to reduce penetration therethrough of any radiation emitted by the nuclear plant component, and an axially extending central opening through which the moveable mast can extend, the mast shield canister having an upper end portion and a lower end portion, with a first stop on the upper end portion of the mast shield canister and/or on a lower end of the moveable mast, preventing the lower end of the moveable mast from withdrawing out of the upper end portion of the mast shield canister, and a second stop on either one or both of the stationary mast and the mast shield canister, that prevents the mast shield canister from moving more than a preselected distance from the stationary mast, the moveable mast is configured to supportingly carry the mast shield canister the preselected distance, and while the second stop prevents the canister from moving more than the preselected distance, the lower end of the moveable mast is axially moveable relative to the canister, the mast shield canister being sized to fit over substantially the full length of the nuclear plant component; and a gripper assembly supported at a lower end of the moveable mast and is configured to grip the nuclear plant component through the lower end portion of the mast shield canister.

2. The machine of claim 1 wherein the preselected distance is substantially long enough to place the mast shield canister on top of the nuclear plant component.

3. A machine for moving a nuclear plant component from a first location to another comprising:

a bridge assembly for positioning the machine over the nuclear plant component to be moved;

a stationary mast supported from the bridge assembly at a first end and extending down from the bridge assembly in a direction of the nuclear plant component;

a moveable mast, telescopingly nested within the stationary mast and configured to extend from the stationary mast and retract within the stationary mast under the control of an operator;

a mast shield canister having an axially extending central opening through which the moveable mast can extend, the mast shield canister having an upper end portion and a lower end portion, with a first stop on the upper end portion of the mast shield canister and/or on a lower end of the moveable mast preventing the lower end of the moveable mast from withdrawing out of the upper end portion of the mast shield canister and a second stop on either or both the stationary mast or the mast shield canister that prevents the mast shield canister from moving more than a preselected distance from the stationary mast, the mast shield canister being sized at least to fit over substantially the full length of the nuclear plant component;

a gripper assembly supported at a lower end of the moveable mast and is configured to grip the nuclear plant component through the lower end portion of the mast shield canister; and wherein the first stop comprises a first set of rollers circumferentially supported around an inner wall of the central opening on the upper end portion of the mast shield canister, that is at least in part in axial and circumferential alignment with a second set of rollers on the lower end of the moveable mast, below the first set of rollers.

4. The machine of claim 1 wherein the second stop is a rod or cable attached to the upper end portion of the mast shield canister at a first end of the rod or cable and slidably coupled to the stationary mast at a second end portion of the rod or cable through an opening in an eyelet or tube that is affixed to the stationary mast with a second end of the second end portion of the rod or cable being larger than the opening in the eyelet or tube.

5. The machine of claim 1 wherein the mast shield canister is configured so that a downward movement of the mast shield canister relative to the moveable mast is powered solely under the force of gravity and an upward movement of the mast shield canister relative to the stationary mast is solely under the power of the moveable mast.

6. The machine of claim 1 including a transfer cart comprising;

a moveable platform for moving the nuclear plant component from a first location to a second location;

a transfer cart shield canister having a central opening substantially completely enclosed by a shield wall system except for an open end providing access to the central opening, the central opening being sized to substantially enclose the nuclear plant component; and a rotatable coupling between the moveable platform and the transfer cart shield canister for rotating the transfer cart shield canister from a generally horizontal position, where the nuclear plant component within the transfer cart shield canister is on a side, to a generally vertical position where the open end is facing substantially in an upward direction to face the gripper assembly, and back to the horizontal position.

7. The machine of claim 6 wherein the central opening in the transfer cart shield canister substantially matches the central opening through the mast shield canister and the gripper assembly is configured to extend through the lower end portion of the mast shield canister into the central opening of the transfer cart shield canister to place the nuclear plant component within the transfer cart shield canister.

8. The machine of claim 1 wherein the nuclear component is a nuclear fuel assembly.

9. The machine of claim 1 wherein the mast shield canister is configured to be detachable from the moveable mast and replaced with a second mast shield canister of a different dimension sized to accommodate a second nuclear component therein of a corresponding dimension.

* * * * *